United States Patent
Hallock et al.

[11] Patent Number: 5,818,819
[45] Date of Patent: Oct. 6, 1998

[54] METHODS FOR PERFORMING INTELLIGNET NETWORK SERVICES WITH AN ISDN NETWORK TERMINATOR LOCATED AT A SUBSCRIBER'S PREMISES

[75] Inventors: Charles Clifford Hallock, Delray Beach; Baiju Dhirajlal Mandalia, Boca Raton; Himanshu Chandrakant Parikh, Coconut Creek; Gaby J. Salem, Coral Springs; Charles Henry Sederholm, Lighthouse Point; Wasim Joseph Shomar, Miami; Carl Louis Thomson, Jr., Delray Beach, all of Fla.

[73] Assignee: International Business Machines Corporation, Armonk, N.Y.

[21] Appl. No.: 707,811

[22] Filed: Aug. 30, 1996

Related U.S. Application Data

[63] Continuation of Ser. No. 267,057, Jun. 27, 1994, abandoned.

[51] Int. Cl.⁶ .................................................. H04M 3/42
[52] U.S. Cl. ..................................... 370/259; 379/215
[58] Field of Search .......................... 370/58.1, 58.2, 370/58.3, 110.1, 62, 351, 259, 357, 360, 384, 385, 373, 374, 522, 420, 260; 397/215, 201, 397, 159, 160, 161

[56] References Cited

U.S. PATENT DOCUMENTS

| | | | |
|---|---|---|---|
| 4,853,949 | 8/1989 | Schorr et al. | 379/2 |
| 4,864,542 | 9/1989 | Oshima et al. | 365/189.01 |
| 4,884,269 | 11/1989 | Duncanson et al. | 370/110.1 |
| 4,885,769 | 12/1989 | Beierle | 379/210 |
| 4,893,336 | 1/1990 | Wuthnow | 379/211 |
| 4,924,492 | 5/1990 | Gitlin et al. | 379/93 |
| 4,932,022 | 6/1990 | Keeney et al. | 370/60 |
| 4,970,723 | 11/1990 | Lin | 370/110.1 |
| 4,972,463 | 11/1990 | Danielson et al. | 379/91 |
| 4,975,944 | 12/1990 | Cho | 379/215 |
| 4,995,074 | 2/1991 | Goldman et al. | 379/215 |
| 5,023,868 | 6/1991 | Davidson et al. | 370/62 |
| 5,023,869 | 6/1991 | Grover et al. | 370/84 |
| 5,138,657 | 8/1992 | Colton et al. | 379/220 |
| 5,157,656 | 10/1992 | Turudic et al. | 370/84 |
| 5,191,456 | 3/1993 | Sutherland et al. | 359/118 |
| 5,195,125 | 3/1993 | Bliven et al. | 379/29 |
| 5,204,860 | 4/1993 | Sparks | 370/110.1 |
| 5,289,538 | 2/1994 | Lauer et al. | 379/402 |
| 5,305,312 | 4/1994 | Fornek et al. | 370/110.1 |
| 5,422,943 | 6/1995 | Cooney et al. | 370/110.1 |

*Primary Examiner*—Chau Nguyen
*Attorney, Agent, or Firm*—Kudirka & Jobse, LLP; Thomas F. Galvin

[57] ABSTRACT

Disclosed are call processing methods which are performed by a network terminator located at a subscriber's premises. The network terminator is coupled to a digital network and a communication device at the subscriber's premises and can perform call waiting, caller identification, call conferencing without intervention from a telco's switching system that requires an additional charge to the subscriber for these services. In addition, the network terminator can perform a method which allows two digital communication devices coupled to one S-bus to share a communication session. In another embodiment, up to a six way conference call can be established with an analog telephone coupled to an ISDN network via the network terminator of the present invention.

16 Claims, 9 Drawing Sheets

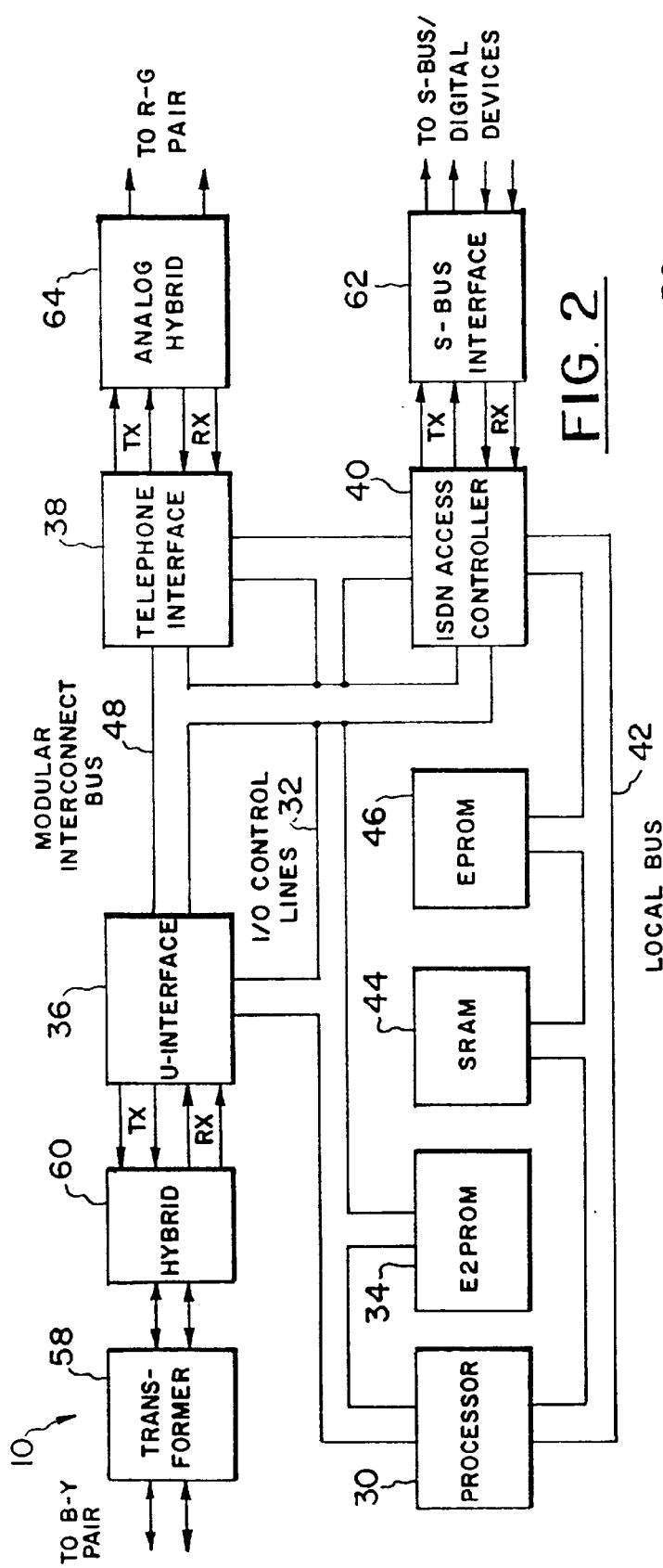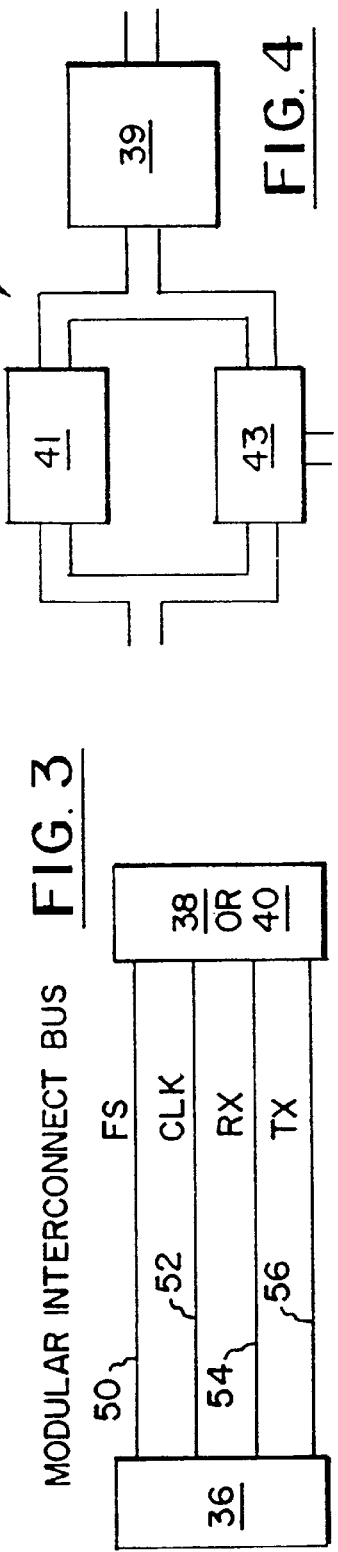

FIG.11

| CURRENT STATE | RESULT OF SHORT HOOK FLASH | RESULT OF LONG HOOK FLASH | RESULT OF DOUBLE HOOK FLASH |
|---|---|---|---|
| DIAL OR BUSY TONE<br>NO CALLS ON HOLD<br>NO CALL WAITING<br>NO CONFERENCE | DIAL TONE | DIAL TONE | DIAL TONE |
| ACTIVE CALL<br>NO CALL WAITING<br>NO CALLS ON HOLD<br>NO CONFERENCE | HOLD ACTIVE CALL<br>DIAL TONE | DISCONNECT<br>ACTIVE CALL<br>DIAL TONE | HOLD ACTIVE CALL<br>DIAL TONE |
| ACTIVE CALL<br>CALL WAITING<br>NO CONFERENCE | HOLD ACTIVE CALL<br>ANSWER WAITING CALL | DISCONNECT<br>ACTIVE CALL<br>ANSWER WAITING CALL | HOLD ACTIVE CALL<br>HOLD WAITING CALL<br>DIAL TONE |
| ACTIVE CALL<br>NO CALL WAITING<br>CALL ON HOLD<br>NO CONFERENCE | HOLD ACTIVE CALL<br>CONNECT TO OLDEST<br>CALL ON HOLD | DISCONNECT ACTIVE<br>CALL<br>CONNECT TO OLDEST<br>CALL ON HOLD | LEAVE CALL ON HOLD<br>HOLD ACTIVE CALL<br>DIAL TONE |
| DIAL TONE<br>ONE CALL ON HOLD<br>NO CONFERENCE | CONNECT TO CALL<br>ON HOLD | CONNECT TO CALL<br>ON HOLD | CALL ON HOLD<br>DIAL TONE |
| DIAL TONE<br>TWO CALLS ON HOLD | CONNECT TO OLDEST<br>CALL ON HOLD | CONNECT TO OLDEST<br>CALL ON HOLD | TWO CALLS ON HOLD<br>DIAL TONE |
| DIAL OR BUSY TONE<br>CONFERENCE ESTABLISHED | JOIN CONFERENCE | JOIN CONFERENCE | CONFERENCE ESTABLISHED<br>DIAL TONE |
| ACTIVE CALL<br>CONFERENCE ESTABLISHED | ADD ACTIVE CALL<br>TO CONFERENCE<br>JOIN CONFERENCE | TERMINATE ACTIVE<br>CALL<br>JOIN CONFERENCE | ADD ACTIVE CALL<br>TO CONFERENCE<br>DIAL TONE |
| IN CONFERENCE | HOLD CONFERENCE<br>DIAL TONE | TERMINATE CONFERENCE<br>DIAL TONE | HOLD CONFERENCE<br>DIAL TONE |

METHODS FOR PERFORMING INTELLIGNET NETWORK SERVICES WITH AN ISDN NETWORK TERMINATOR LOCATED AT A SUBSCRIBER'S PREMISES

This is a continuation of application Ser. No. 08/267,057, filed Jun. 27, 1994, abandoned.

BACKGROUND OF THE INVENTION

1. Field of the Invention

This invention relates generally to telecommunication call processing for a telephone subscriber and more particularly to a network terminator based arrangement located at a subscriber's premise for performing call waiting, caller identification, call conferencing, call forwarding and dual digital device communication sharing on one S-bus.

2. Description of Related Art

ISDN is defined by internationally accepted standard digital network user interfaces. The resulting network offers a variety of subscriber access lines capable of supporting services including voice, data, facsimile, and video. There are two International Telegraph and Telephone Consultative Committee (CCITT) recommended standard integrated services digital network interfaces for user access. They include a basic rate interface (BRI) and a primary rate interface (PRI). By integrating these various services on a single transport system means, the subscriber avoids buying multiple services to meet multiple service needs. As a practical consideration a single transport system requires less overhead than providing a discrete access line for each service, and results in a total lower cost of service.

An ISDN Basic Rate Interface (BRI) consists of three channels, referred to as two B channels plus a D channel (2B+D), in which all signals flowing over the external telephone company (telco) lines are carried in a baseband digital form and in a standardized frame format. With this arrangement, the B channels are the basic user channels which carry digital voice, high-speed data, and other functions at a maximum channel rate of 64 kbps. The D channel bit rate in this interface is 16 kbps and may serve two purposes. First, the D channel carries control signalling information to control circuit-switched calls on associated B channels at the user interface. In addition, the D channel may be used for packet switching or low speed telemetry when not carrying signalling information. Accordingly, an ISDN Primary Rate Interface consists of multiple B channels and one 64 kbps D channel having primary rates of either 1544 kbps (23B+D) or 2048 kbps (30B+D).

The BRI may be arranged to provide simultaneous voice and data services in several ways giving users flexibility in configuring their services. A user may use each B channel for voice service, for circuit switched data transport, or for packet switched data services. The D channel can carry packet switched data which interleaves data packets with signaling packets. The BRI may provide a maximum of either two data B channels or one voice B channel and another voice or data channel.

Typically, a single line subscriber premise is wired with two discrete pairs of wires, sometimes referred to as plain old telephone service (POTS). In the POTS configuration, one pair of signal wires provides a communication path between analog terminal equipment and a junction box that interfaces to external telco wiring. Another pair of signal wires provides a second, or spare, path between analog terminal equipment and the external junction box.

Although ISDN networks are widely used in current telecommunication systems, coexistence between analog and digital terminal equipment at a customer premise on a single subscription line has heretofore been impractical. As one solution, discrete digital and analog classes of service to the subscriber premise are provided in order to offer support to both analog and digital devices. Thus, when a single line subscriber elects to add ISDN service, a junction box connection that interfaces to external telco wiring typically remains fixed, but internal POTS wiring is either bypassed or elaborately modified in order to provide a communication path for digital ISDN signals if only one pair of pre-existing wires exist.

As an alternative solution, a single line subscriber may elect to convert from an analog to a digital class of service. In that scenario, the subscriber premise is converted to accommodate digital terminal equipment only. In so doing, the subscriber is compelled to scrap pre-existing conventional telephone (POTS) wiring and terminal equipment, which had effectively become useless, in order to maintain a single (digital) class of service.

The desirable solution is disclosed in co-pending, earlier filed U.S. patent application Ser. No. 085,333, U.S. Pat. No. 5,448,635, filed Jun. 30, 1993 and owned in common with this invention. This application discloses an architecture and apparatus for connecting both analog and digital devices in a subscriber premise to a single subscription line in an ISDN network, using existing POTS wiring in the premises.

A disadvantage to an ISDN subscriber arises from various types of class services (e.g., call forwarding, call waiting, caller ID) which are currently handled by the central office switching system and require the user to pay additional charges for their use. An ISDN network includes an ISDN central office switching system which is connected to communication device(s) located at a subscriber's premise via the subscriber's telephone line. A computer is connected to the switching system which transmits to the computer associated messages corresponding to call handling information exchanged between the switching system and the user telephone stations connected thereto.

In operation, various types of class services (e.g., call forwarding, call waiting, caller ID) are handled by the central office switching system by transmitting call handling messages (e.g., SETUP, ALERTING, CONNECT, DISCONNECT) from the switch to the user station and vice-versa. The interface between the switch and the station is typically the basic rate interface (2B+D). Since class services currently require processing by the central office switch, the user incurs an additional charge by the telco for these services.

Another disadvantage to a subscriber arises when a digital class of service is used and more than one digital communication device is connected to a single S-bus at the subscriber's premise. According to current standards for Layer 1 characteristics of ISDN user-network interfaces (CCITT Recommendation I.430), only one digital communication device can be active during a communication session. For example, in a subscriber premise having at least two digital telephone stations connected to a single S-bus, after a subscriber has picked up a receiver of one of the stations no other receiver can be used to talk on the same phone conversation.

A further disadvantage results from the lack of a basic electronic key telephone service (EKTS) for analog phones. Digital telephones currently operate with EKTS and call appearance call handling (CACH) EKTS standards provided by the ISDN network. The digital EKTS phones have numerous buttons and display lights (or a digital display) to allow a user to perform functions such as call conferencing, call hold/retrieve, etc. and the lights or display are used to indicate to the user that these features have been activated. However, there is no such EKTS facilities used for analog telephones. In addition, since the network terminator described in the '333 application will couple analog devices to the ISDN network, there is a need to develop a user interface for allowing a user to perform functions such as call conferencing and call hold/retrieve on an analog telephone coupled to ISDN EKTS service.

Accordingly, it is an object of the present invention to provide a subscriber's premise with a network terminator based arrangement which can utilize the B-channels of an ISDN network to perform call waiting, caller identification, call conferencing, call forwarding and communication sharing on one S-bus with more than one digital communication device. It is a further object of the present invention to provide these call processing functions to digital and/or analog devices at the subscriber's premise. It is yet a further object of the present invention to provide a user interface for mapping actions performed on an analog telephone into EKTS signals recognized by an ISDN network. It is another object of the present invention to provide a single line communication path between digital and analog devices at a subscriber's premise and an ISDN network through existing POTS wiring.

SUMMARY OF THE INVENTION

The present invention is directed to a network terminator (adapter) based arrangement located at a subscriber's premise which can be connected to a digital telephone network and can perform various call processing functions without the requirement of intervention from a telco switch. The network adapter includes a processor which can perform digital signal processing functions in accordance with the present invention. The adapter is operatively coupled to the digital network and a communication device at the subscriber's premise.

One embodiment of the present invention is directed to a call processing method which implements call waiting in the network adapter based arrangement. The method includes the step of establishing a first call on a communication device at the subscriber's premise on a first communication channel. Next, in response to a determination that a second call is being made to the subscriber's premise, the adapter will connect the second call on a second communication channel.

If the subscriber's premise does not include a second communication device coupled to the second communication channel, then after connecting the second call on the second communication channel, the adapter will send a private alerting signal to the user (e.g., beeps). Next, the program will enter a loop whereby the user will have the option to toggle between the first and second calls indefinitely until a disconnect request is made from any of the parties to the call. By connecting the two calls on the two communication channels and toggling between them at the user's option, the adapter eliminates the need for intervention from the telco switch to perform call waiting.

Another embodiment of the present invention is directed to a call processing method which implements caller identification (ID) in the network adapter based arrangement without the need for a separate caller ID box. The method includes the step of receiving a call SETUP message from a switching system specifying an incoming call to the subscriber's premise. The call SETUP message contains information on the identity of the number initiating the call. After determining that caller ID is activated at the subscriber's premise and that the receiver has been picked up, the adapter will extract a first message identifying the call from the call SETUP message. Next, the processor within the adapter will voice synthesize the first message to the receiver such that the subscriber will hear an identifying message. The identifying message can be the number of the incoming caller.

Alternatively, the adapter can be provided with a preprogrammed lookup table having a plurality of numbers each of which having a corresponding name. Before voice synthesizing the identifying number to the receiver the adapter can determine whether the identifying number matches any one of the plurality of numbers in the lookup table. In response to a determination that the identifying number matches any one of the plurality of numbers, the adapter will voice synthesize the name to the receiver. In response to a determination that the identifying number does not match any one of the plurality of numbers, the adapter will voice synthesize the identifying number to the receiver.

After hearing the identifying information (number or name of caller) the subscriber has the option of accepting or rejecting the call. If the user chooses to accept the call, the adapter will connect it to an available communication channel. If the user decides not to receive the call, the adapter will continue to return a ringing signal to the caller and return to an idle state.

A further embodiment of the present invention is directed to a call processing method for conferencing up to three calls from a communication device at the subscriber's premise using the network adapter based arrangement of the present invention. The method includes the step of establishing a first call on the communication device at the subscriber's premise on a first communication channel. The next step is to initiate from the communication device a call setup request to establish a second call. After the second call is accepted, the adapter will connect the second call on a second communication channel. Next, the adapter will establish a three way communication path between the communication device and the first and second calls by mixing voice data on said first communication channel with voice data on said second communication channel such that each person can listen to each other.

The voice mixing is performed by the processor within the adapter. The local voice signal of one B-channel (B1) is copied downstream of B1 to the upstream of the other B-channel (B2) while the local voice data signal of B2 is copied downstream of B2 to the upstream of B1. This automatically establishes a three way conference call and allows each of the parties to communicate with each other. This voice mixing of the two B-channels by the processor will continue until a disconnect request is made by any one of the parties to the conference call. By connecting each of the calls to a separate communication channel and voice mixing the two channels, the adapter eliminates the need for the Telco's switching system to conference the calls.

Another embodiment of the present invention is directed to a call processing method of forwarding a call made to a first communication device at the subscriber's premise to an alternate destination utilizing the network adapter based arrangement. The method includes the step of receiving at the adapter a message from a switching system specifying an incoming call to the subscriber's premise. Next, the adapter will initiate a first connection on a first communication channel between the first communication device and a second communication device at the alternate destination.

After the first connection is established, the incoming call is connected to the first communication device on a second communication channel.

Next, the processor will establish a communication path between the incoming call and the alternate destination by mixing voice data on the first communication channel with voice data on the second communication channel such that a voice communication path is established by the adapter between the incoming call and the alternate destination. The processor will continue voice mixing until a disconnect request is made from the incoming caller or the alternate destination. The method according to this embodiment removes the Telco switch from performing call forwarding.

In each of the above described embodiments the digital network can be an Integrated Services Digital Network (ISDN) and the first and second communication channels can be ISDN B-channels of a basic rate interface. The communication device at the subscriber's premise can be either an analog or a digital device.

In another embodiment of the present invention, flash hook and touch tone commands allow a user to perform call hold/retrieve, call waiting and three way call conferencing functions on an analog telephone coupled to an ISDN network via the network terminator of the present invention. In addition, if multiple call appearances are provided by the telco, then up to a six way conference call can be established with the analog phone. Each of these call conferencing functions are performed on one B-channel according to EKTS standards. The analog signals (switch hook and touch tone commands) input by a user to the analog phone are converted to ISDN EKTS signals by a telephone interface within the adapter of the present invention.

BRIEF DESCRIPTION OF THE DRAWINGS

FIG. 2 is a block diagram illustrating a network adapter based implementation of a call processing arrangement in accordance with the present invention.

FIG. 3 is a block diagram illustrating a modular interconnect bus used in the network adapter according to the present invention.

FIG. 4 is a block diagram illustrating a telephone interface used in the network adapter according to the present invention.

FIG. 11 is a switch hook state table for an analog telephone coupled to an ISDN network via the adapter of the present invention showing a current state along with the state resulting from each of three flash hook activities.

DETAILED DESCRIPTION OF THE INVENTION

Figure 1:
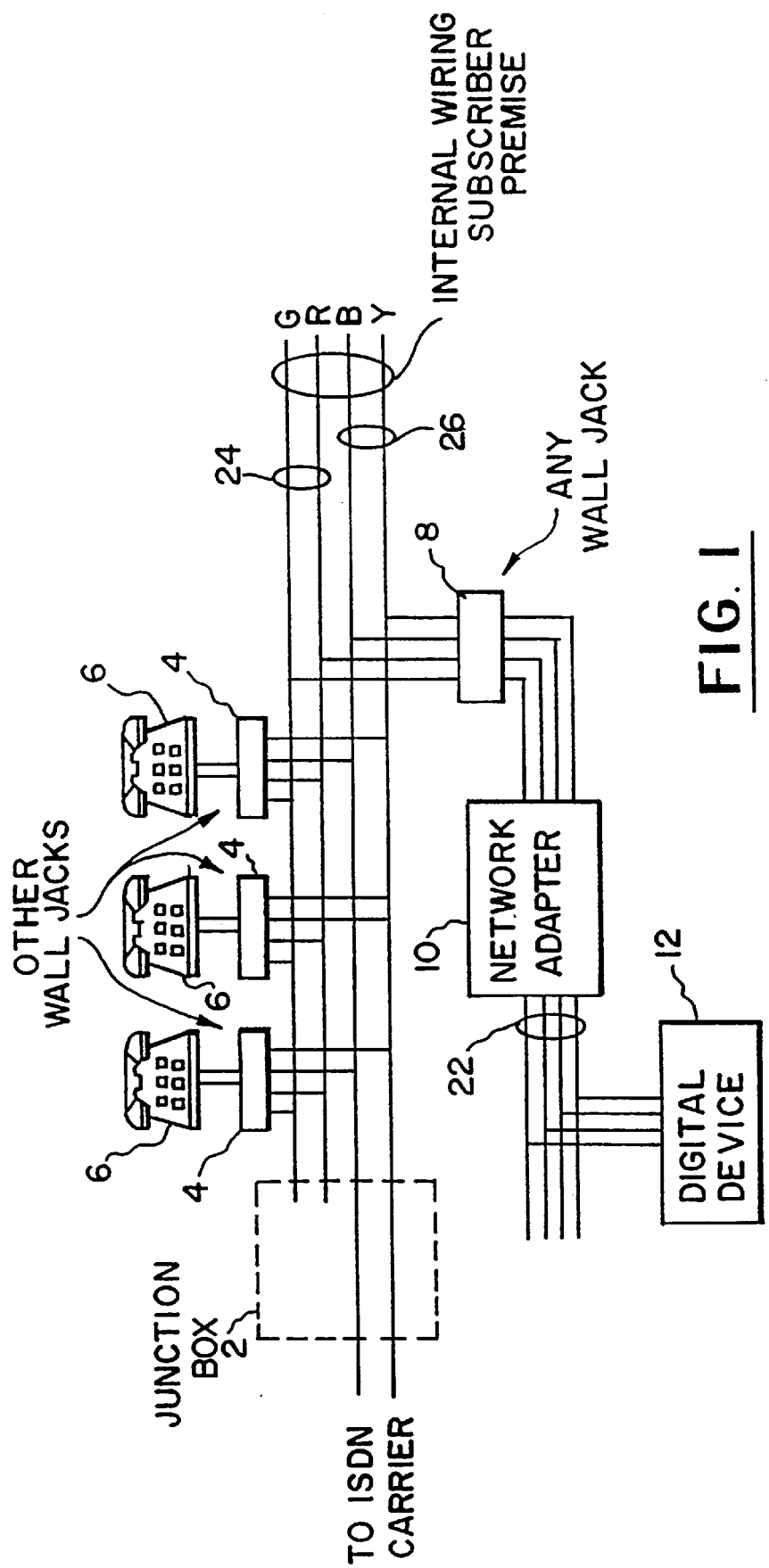
FIG. 1 illustrates a schematic overview of a communication wiring scheme and network adapter utilized in accordance with the methods of the present invention.

FIG. 1 illustrates an arrangement for linking both analog and digital devices to a single subscription line in an ISDN network, using pre-existing telephone wires 24, 26. This arrangement serves a number of functions (some of which will be more particularly described hereinafter) and is more fully disclosed in co-pending, earlier filed U.S. patent application Ser. No. 085,333, filed Jun. 30, 1993 now U.S. Pat. No. 5,448,635 and owned in common with this invention. To any extent necessary or appropriate to a full understanding of this invention, the co-pending application is hereby incorporated by reference into the present description.

The wiring in a subscriber premise comprises four signal wires. These wires extend to a junction box 2 that connects the customer premise to an ISDN carrier network. Inside the premise, these wires terminate at modular telephone jacks 4 located in the walls of the subscriber premise. A Green-Red (G-R) pair of wires 24 is coupled to analog terminal equipment such as communication devices 6 (e.g., telephone equipment), while a Black-Yellow pair of wires 26 is coupled to the ISDN digital carrier network. Telco carrier network wiring at the junction box 2 is connected to the pair of wires 26 and isolated from the pair of wires 24.

A network adapter 10 is plugged into any wall jack 8. The network adapter 10 serves as an interface between two wire subscriber loop signals on wires 26 in a standardized digital form, and an S-bus 22 through which digital devices 12 (e.g., digital telephone equipment, fax machine, etc.) are connected. The digital and analog interface network adapter 10 also serves as an interface between two wire subscriber loop signals on wires 26, in the standardized digital form, and analog devices that connect to the G-R wire pair 24 via other wall jacks 4 (jacks other than jack 8).

The B-Y wire pair 26 is adapted at the junction box 2 to interface with the Telco ISDN carrier network. Likewise, the G-R wires are "open" at the junction box but connected uniformly to analog devices. The wiring change at the junction box 2 may be adapted by manually changing the wires at the junction box 2.

With the arrangement as described in FIG. 1, the S-bus wiring can be provided with a (usually short) cable extending from network adapter 10 to digital equipment located near the adapter 10 (usually one device or set of devices sharing a single network port). Accordingly, the network adapter 10 is plugged into a modular telephone jack 8 at any desired (room, wall) location and the telco carrier interface is adapted as shown. The S-bus shown need not extend through any walls if all digital devices are in the same room as the adapter. However, the wiring scheme may require extended (additional) S-bus wiring for additional digital devices and terminal adapters.

With this arrangement, all signals flowing between the external telco carrier network and the customer premise are channeled through the network adapter 10 (via the internal B-Y pair 26 and the inside jack 8 to which the network adapter 10 is connected). All signals flowing between the network adapter 10 and digital devices run through the S-bus 22 interface between the network adapter 10 and the digital devices. All signals flowing between the network adapter 10 and any analog device run through the R-G pair 24 between the jack 8, at which the network adapter 10 is connected and another jack 4, at which the analog device is connected.

It should be understood that with this arrangement, signals flowing between any analog device and the external carrier network pass in analog form through the R-G pair linking the jack 4, at which the analog device is connected, to the adapter 10; get converted in the adapter 10 between analog and two wire digital ISDN forms; and pass in the latter form between the adapter 10 and the external carrier network, via the internal B-Y pair of wires 26 and the junction box 2. Signals flowing between any digital device and the external telco lines pass in digital form between the device and the adapter 10 via the S-bus 22; get converted in the adapter 10 between four wire S-bus digital form and two wire digital ISDN; and pass in the latter form between the adapter 10 and the external carrier network, via the B-Y pair 26 and the junction box 2.

FIG. 1 illustrates internal wiring at the subscriber premise configures as a single loop. With the single loop configuration, analog devices may be connected to the junction box 2 at any one of the modular telephone jacks 4 along the loop. It should be understood that alternate internal wiring configurations may be found at the subscriber premise, with another configuration presently contemplated being a star wiring configuration. With the star wiring configuration, a jack 4 at any branch of the star configuration may individually connect an analog device to the junction box 2 (configuration not shown).

Referring now to FIG. 2, number 10 refers to the block diagram of the digital and analog network adapter architecture constructed according to the teachings of the present invention. The adapter 10 includes a system processor 30 which is connected by I/O control lines 32 to an E2PROM 34, U interface device 36, telephone interface 38 and ISDN access controller 40. The processor 30 can be any suitable microprocessor which also performs data signal processing functions. One suitable microprocessor is the 8031 which is sold by INTEL. Alternatively, the processor 30 can be a Digital Signal Processor (DSP) which also performs microprocessing functions. One suitable DSP is the MWAVE MSP1.0 which is sold by IBM. A suitable U interface device 36 is the PEB 2091; a suitable ISDN access controller 40 is the PEB 2070 or 2081. Each of the PEB devices is sold by Siemens Components, Inc.

Continuing with the description of FIG. 2, a local bus 42 further connects the processor 30, SRAM 44, and EPROM 46. The local bus 42 comprises conductors used for transmitting address, data, or control signals between interconnected devices.

Referring still to FIG. 2, modular interconnect bus 48 interconnects the U interface 36, telephone interface 38, and ISDN access controller 40. As seen in FIG. 3, modular interconnect bus 48 consists of four discrete signal lines including a 8 Khz frame sync (FS) signal line 50, data clock (CLK) line 52, receive serial bit stream (RX) signal line 54, and a transmit serial bit stream (TX) signal line 56. While modular interconnect bus 48 serves to connect the U interface 36, telephone interface 38, and ISDN access controller 40, bus 48 may also be used to connect other diverse voice/data modules (sources or targets for the D channel, or sources or targets for the B1 and B2 channels).

The U interface device 36 is further connected to an input transformer 58 through a hybrid 60. The input transformer 58 is connectable to one pair of "through-connected" pre-existing telephone wires 26 within the subscriber premise and acts as a transformer and driver to the telephone network. As such, the "through connected" pair of telephone wires 26 is operatively connected to the telephone network but not coupled to any analog devices within the subscriber premise. The pair of wires 26 may be the B-Y pair, according to the typical POTS configuration, as described.

Thus, a signal coming from the Telco network is first adapted at transformer 58 for input to the hybrid 60, where the signal is split into discrete transmit and receive signals. Partial cancellation of local echo and correct impedance matching to a four wire input for the U interface 36 is further performed by hybrid 60.

The U interface 36 further conditions the incoming signal by performing echo cancellation and equalization on the four wire digital signals received, and converts the signals into a TTL level binary stream which contains digital information. The echo cancellation with hybrid (ECH) principle is one which supports full duplex operation over a two wire subscriber loop. The ECH method and resultant TTL level binary stream are in conformance with ANSI standard T1.601.

In the preferred embodiment, the network adapter architecture 10 has been configured to interface with a BRI ISDN. Call processing of B-channel and D-channel data is performed according to CCITT spec Q.931 protocol which comprises processing carrier network and adapter 10 functions for both incoming and outgoing calls. Call processing of B-channel data with adapter 10 for analog and digital devices is described in more detail in copending U.S. patent application Ser. No. 085,333 mentioned above. The U interface 36 is of the type to accommodate a 2B1Q, or other standard digital channelized form as required by the local telephone network. For 2B1Q line coding, for example, pairs of bits are represented as one of four quantum levels. This is a four level pulse amplitude modulation (PAM) code without redundancy. The coded signal is a two wire subscriber loop signal characterized as having a frequency spectrum which is lower than the frequency spectrum of an uncoded digital signal. The two wire subscriber loop signal offers reduced line attenuation and crosstalk over the ISDN. In so doing, an 80 Khz 2B1Q two wire subscriber loop signal at the U interface 36 may be converted into two discrete 160 Khz signals (transmit and receive).

The ISDN access controller 40 is connected by S-bus interface 62 to S-bus 22. Interface 62 comprises a four wire interface at the S-bus 22 for connecting one or more digital devices within the subscriber premise. S-bus interface 62 contains a four wire transformer that supports up to eight digital devices according to the ANSI T1.605 standard.

The telephone interface 38 is further connectable by analog hybrid 64 to the other pair of pre-existing telephone wires 24 within the subscriber premise. The other pair of pre-existing telephone wires 24 is operatively connected to analog devices within the subscriber premise; e.g., the G-R pair in the typical POTS configuration, as described. The other pair of pre-existing telephone wires 24, as distinguished from the first pair of pre-existing wires 26, is connected only to existing analog devices within the subscriber premise (at jacks other than jack 2A). In the preferred embodiment, the analog hybrid 64 is a subscriber line interface circuit providing drive, on-hook, and off-hook functions to the analog devices and telco network.

As shown in FIG. 4, the telephone interface 38 comprises a subscriber line interface circuit 39 which accepts commands such as for example, switch hook commands such as off-hook, on-hook, flash, etc. that are interpreted by the processor 30 via interrupts. The interface circuit 39 also accepts touch tone commands that are interpreted by a dual tone multiple frequency (DTMF) detector 41. An audio ringing codec filter 43 under control of the processor 30 generates tones and performs digital to analog conversions of the signals to be sent to the communication device via the interface circuit 39. A suitable subscriber line interface circuit 39 is the HC-5504B sold by Harris Corporation; a suitable DTMF detector 41 is the MC 145436 sold by Motorola; a suitable audio ringing codec filter is the PSB 2160 sold by Siemens Components, Inc.

The interface circuit 39, DTMF decoder 41 and filter 43 are used to convert analog signals (including switch hook and touch tone commands entered by a user on an analog phone) into ISDN signals such as electronic key telephone service (EKTS) or call appearance call handling (CACH) EKTS signals. More specifically, signals flowing between any analog device and the external ISDN network pass in analog form through the analog hybrid 64 and telephone interface 38; get converted in the telephone interface 38 between analog and two wire digital ISDN forms such as EKTS; and pass in the latter form to the ISDN network via U-interface 36 and hybrid 60.

It is to be understood that elements in network adapter 10 are connectable to both pairs of pre-existing telephone wires 24, 26 through any modular telephone jack 8. That is, a single plug serves to connect the network adapter 10 to both the carrier network and analog devices.

System processor 30 controls its internal operation as well as interfacing with other elements of the network adapter 10. It should be understood by those skilled in the art of the present invention that the processor 30 will perform power on diagnostics and initial program load routines before beginning execution of any of the call processing programs described below. The power on diagnostics and initial program load are well known routines. Each of the call processing programs described below are stored in EPROM 46 and loaded into SRAM 44 during the initial program load routine for execution by the processor 30.

Figure 5:
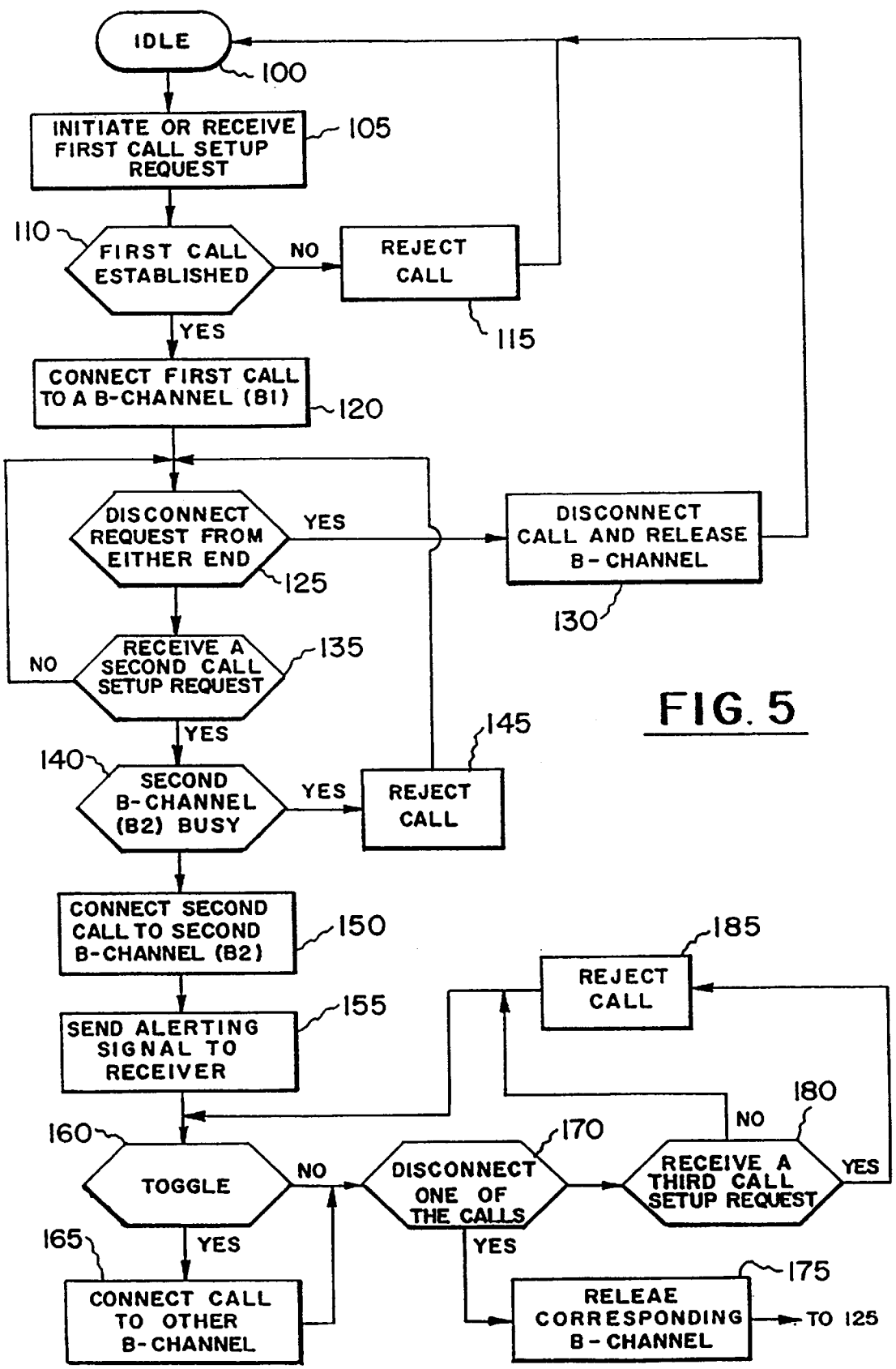
FIG. 5 is a flow chart of a call processing program used for call waiting in the adapter based implementation of FIG. 2.

Referring now to FIG. 5, there is illustrated a flow chart including the basic process steps used by processor 30 in executing a call processing program which implements call waiting in the network adapter based arrangement in accordance with the present invention when one communication device is coupled to both B-channels of a BRI. The coding of the process steps of this flow chart into the instructions suitable to control the processor 30 will be understandable to one having ordinary skill in the art of programming.

After performing initial program load and power on diagnostic routines, the processor 30 enters the IDLE state indicated at block 100. As shown in block 105, program execution begins either in response to a call SETUP message initiated by communication device 6 at the subscriber's premise for an outgoing call or in response to receipt by communication device 6 of a call SETUP message for an incoming call from a Telco ISDN switch. Execution proceeds to block 110 where the processor 30 checks whether the first call has been established. Block 110 represents conventional handshaking whereby the communication device 6 and the ISDN switch are exchanging call handling messages such as SETUP ACK, ALERTING, CONNECT, etc. During block 110, if the call is not established (e.g., a busy line), the NO branch is taken from block 110 to block 115 where the call is rejected and a busy signal is returned to the communication device 6. Next, the processor 30 returns to the IDLE block 100.

Referring back to block 110, when a call is established the YES branch is taken form block 110 to block 120 where the first call is connected to a first B-channel of a Basic Rate Interface. Execution proceeds to block 125 where a check is made to determine whether a DISCONNECT call request has been made from either party to the first call, and if it has, the YES branch is taken from decision block 125 to block 130 to end the call and release the B-channel. The system will then return to the idle state at block 100. If no disconnect request is made, execution proceeds from block 125 to block 135 where a check is made to determine whether a call SETUP message is being transmitted by the ISDN telco switch for an incoming call while the first call is still active. If there is no setup request for an incoming call, the NO branch is taken from block 135 back to block 125. Thus, it can be seen that when one call is active the system will remain in a loop between blocks 125 and 135 while waiting for either an incoming call setup request or a request to disconnect the first call.

Referring back to block 135, if a call SETUP message is received by communication device 6 for an incoming call, the YES branch is taken from block 135 to decision block 140. At decision block 140 the processor 30 checks whether the second B-channel is busy. If the second B-channel is busy, then the YES branch is taken from decision block 140 to block 145 where the call is rejected, a busy signal is returned to the caller making the incoming call and the processor 30 returns to decision block 125. The processor 30 returns to block 125 because there is still one active call connected to the first B-channel.

At block 140 if the second B-channel is not busy then the NO branch is taken to block 150 where the incoming call (second call) will be connected to the second B-channel. Execution proceeds to block 155 where a private alerting signal (e.g., a beep) is sent to the receiver of the subscriber's communication device 6. The subscriber will then have an option to receive/not receive the second call by toggling/not toggling between the first and second calls as shown at block 160. The toggling can be performed by for example, depressing the flash button on the receiver of device 6. If the subscriber decides to toggle and receive the second call, the YES branch is taken from block 160 to block 165 where the subscriber's communication device 6 will be connected to the second B-channel by processor 30 to allow the subscriber to communicate with the second caller. Execution then proceeds to decision block 170.

If the subscriber chose not to toggle at block 160, execution will proceed directly from block 160 to decision block 170 where a check is made to determine whether a disconnect request is made to disconnect one of the B-channels. The disconnect request may arise from either of the three parties on the two calls. If a disconnect is requested from either party to the first or second call, the YES branch is taken from block 170 to block 175 where the corresponding B-channel is released. Execution then proceeds to block 125 and continues as described above. If a disconnect message is not received, the processor 30 proceeds from block 170 to block 180 where it checks whether a third call SETUP message is being transmitted by the ISDN Telco switch for an incoming call. If a third SETUP request is received, the YES branch is taken from block 180 to block 185 where the third call is rejected and a busy signal is returned to the communication device making the third call. The third call is rejected since both B-channels of the BRI are active with a call. Execution then proceeds back to decision block 160 and continues as described above.

If a third call SETUP message was not received, execution will proceed directly from block 180 to block 160 and continue as described above. The logic resulting from blocks 160, 165, 170, 180 and 185 allows the subscriber to toggle indefinitely between the first and second calls until a disconnect message is made from either end of the first or second calls (subscriber included).

Figure 6:
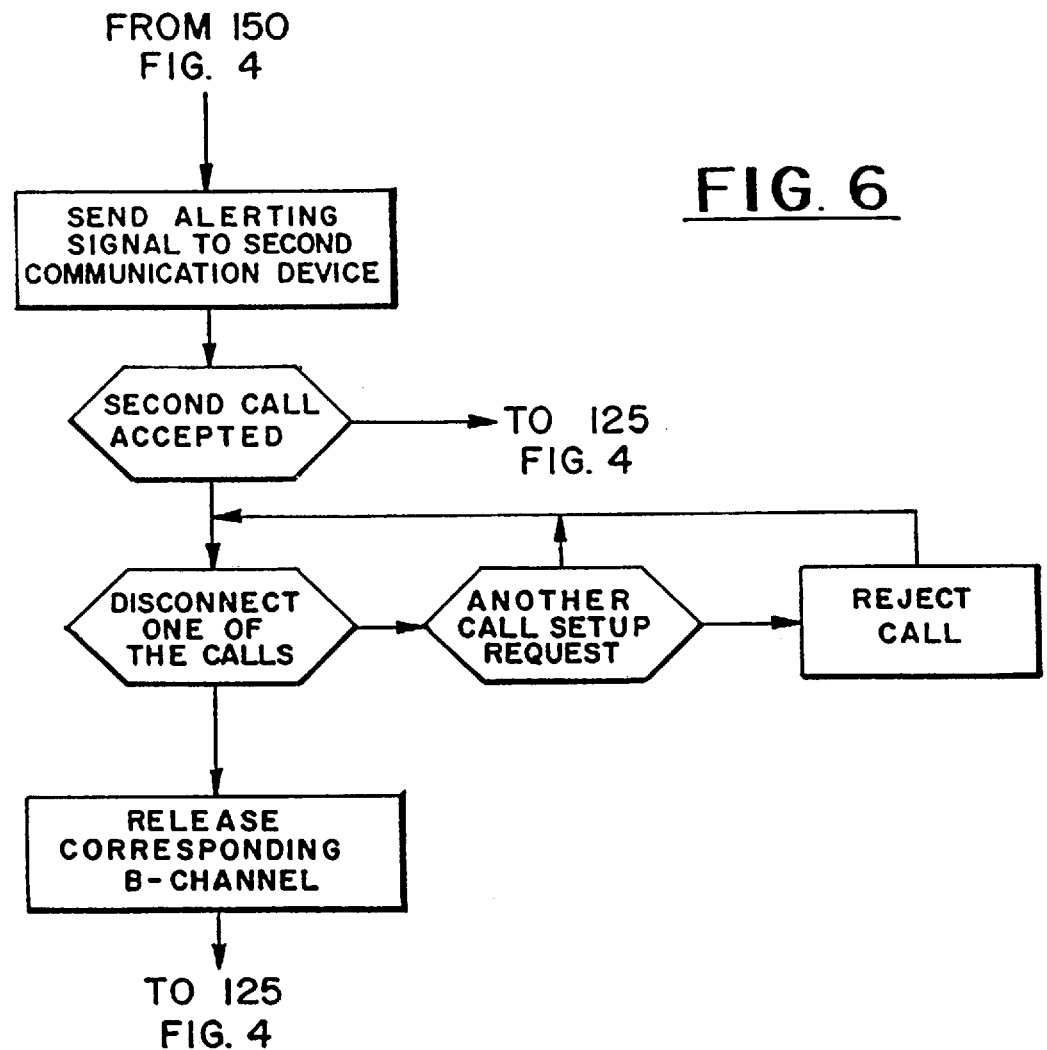
FIG. 6 is a partial flow chart of an alternative embodiment of the call processing program of FIG. 5.

Referring to FIG. 6, there is shown an alternative embodiment of the call waiting program of the present invention. In this embodiment, all steps up to block 150 are identical to that described above with regard to FIG. 5. In this embodiment, the subscriber has a first communication device connected to the first B-channel and a second communication device connected to the second B-channel of a BRI. The first and second communication devices can be two analog devices 6 or two digital devices 12.

After connecting the incoming call to the second B-channel, execution proceeds from block 150 to block 152 where an alerting signal is sent to the second communication device. Execution proceeds to decision block 154 where the subscriber has the option to accept/not accept the second call. At block 154, the processor 30 checks whether the subscriber has accepted the second call (i.e., receiver on second device taken off hook). If the subscriber chooses not to accept the call, the NO branch is taken from block 154 to block 125 where execution proceeds as described above. If the subscriber chooses to accept the call then the YES branch is taken to block 156 where a check is made to determine whether a disconnect request is made by any of the parties to disconnect one of the calls. If a disconnect is requested from either party to the first or second call, the YES branch is taken from block 156 to block 158 where the corresponding B-channel is released. Execution then proceeds to block 125 and continues as described above.

If a disconnect message is not received, the processor 30 proceeds from block 156 to block 162 where it checks whether a third call SETUP message is being transmitted by the ISDN Telco switch for an incoming call. If a third SETUP request is received, the YES branch is taken from block 162 to block 164 where the third call is rejected and a busy signal is returned to the communication device making the third call. Execution then proceeds back to decision block 156 and continues as described above. If a third call SETUP message was not received, execution will proceed directly from block 162 to block 156 and continue as described above.

By connecting the two calls on the two B-channels of a BRI and allowing the subscriber to accept (toggle between calls when only one device is coupled to the BRI or pickup the receiver of a second device when each of two devices are coupled to one B-channel, the adapter 10 eliminates the need for intervention from the Telco switch to perform call waiting at the subscriber's premise.

Figure 7:
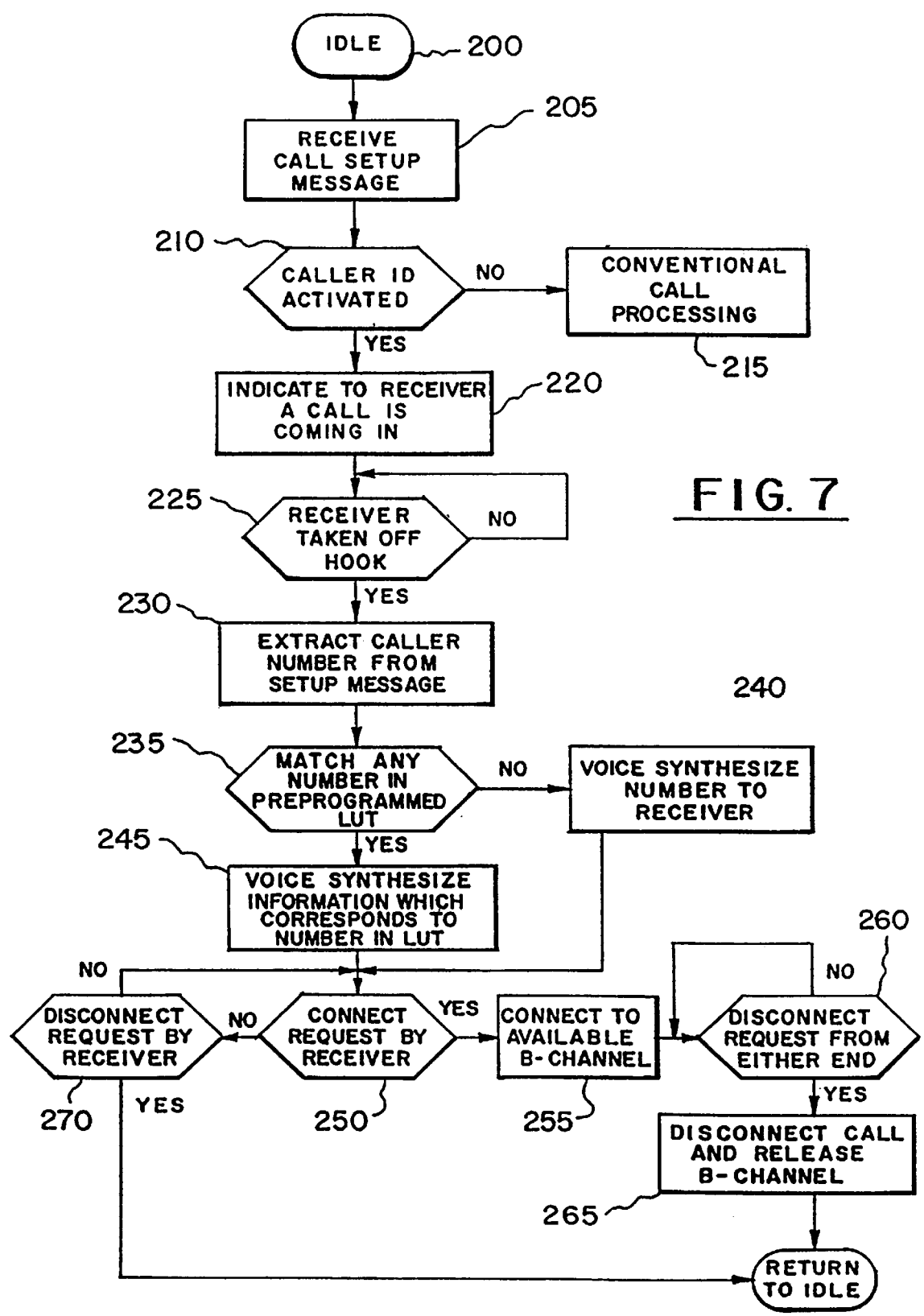
FIG. 7 is a flow chart of a call processing program used for caller identification in the adapter based implementation of FIG. 2.

Referring now to FIG. 7, there is illustrated a flow chart including the basic process steps used by processor 30 in executing a call processing program which implements caller identification in the network adapter based arrangement in accordance with the present invention. Again, the coding of the process steps of this flow chart into the instructions suitable to control the processor 30 will be understandable to one having ordinary skill in the art of programming.

After performing initial program load and power on diagnostic routines, the processor 30 enters the IDLE state indicated at block 200. Program execution begins in response to receipt by communication device 6 of a call SETUP message for an incoming call from the ISDN switch as shown at block 205. The SETUP message includes calling party identity information, e.g., a phone number of the calling party. Next, decision block 210 is entered where a check is made to determine whether caller ID is activated at the subscriber's premise. If caller ID is not activated, the call is conventionally processed and connected to one of the B-channels as indicated at block 215. If caller ID is activated, execution proceeds to block 220 where the processor 30 will indicate to the subscriber that a call is coming through by generating an alerting signal on the communication device 6. Next, execution proceeds to check whether the receiver of the communication device 6 has been picked up (taken off hook) as shown at block 225. The program remains at block 225 until the receiver goes off hook. If no one picks up the receiver, the receiver will continue to ring until the calling party hangs up.

After the receiver is picked up, the YES branch is taken from block 225 to block 230 where the processor 30 will extract the number of the incoming caller from the SETUP message received from the ISDN switch. Execution then proceeds to block 235 where the number is compared to numbers in a preprogrammed look up table (LUT). The LUT can be programmed by the user and contains a plurality of numbers having additional information (e.g., name, address) associated with each number. If the caller's number does not match any of the numbers in the LUT, the NO branch is taken from block 235 to block 240 where the processor 30 will voice synthesize the number to the phone receiver. If the caller's number does match a number in the LUT, the YES branch is taken from block 235 to block 245 where the additional information (e.g., name) which corresponds to the number in the LUT is voice synthesized to the receiver. Execution proceeds from block 240 or 245 to block 250 where after hearing the phone number (or additional information) of the incoming call, the subscriber can choose to accept the call.

At block 250, the processor 30 checks whether the subscriber chose to accept the call. If the subscriber chose to accept the call, a connect request is made and the processor 30 connects the call to the available B-channel as shown at block 255. Execution proceeds from block 255 to block 260 where the processor 30 will remain until a DISCONNECT call request has been made from either party to the call. Once a disconnect message is received, the YES branch is taken from decision block 260 to block 265 to end the call and release the B-channel. The system will then return to the idle state at block 200.

Referring back to block 250, if a connect request is not made, the program proceeds to block 270 where the processor 350 checks whether the subscriber chose not to receive the call. If no choice is made at that time, execution proceeds to block 250 and continues therefrom as described above. Thus, it can be seen that the program will loop within blocks 250 and 270 until the subscriber chooses to accept or deny the incoming call. If the subscriber chooses to reject the call, the YES branch is taken from block 270 back to block 200 where the system returns to the idle state. The device which initiated the call will continue to receive a ringing signal but the device 6 at the subscriber's premise will no longer ring.

Thus, the network adapter 10 of the present invention eliminates the need for a special box for caller ID by sending a private ring to the subscriber's receiver whenever there is an incoming call and delivering the number as a number (block 240) or a name corresponding to the number (block 245) in voice form to the receiver when picked up. The receiving party can then choose whether to accept or reject the call by depressing a key on the receiver, e.g., a short hook flash to accept or a long hook flash to reject the call.

Figure 8:
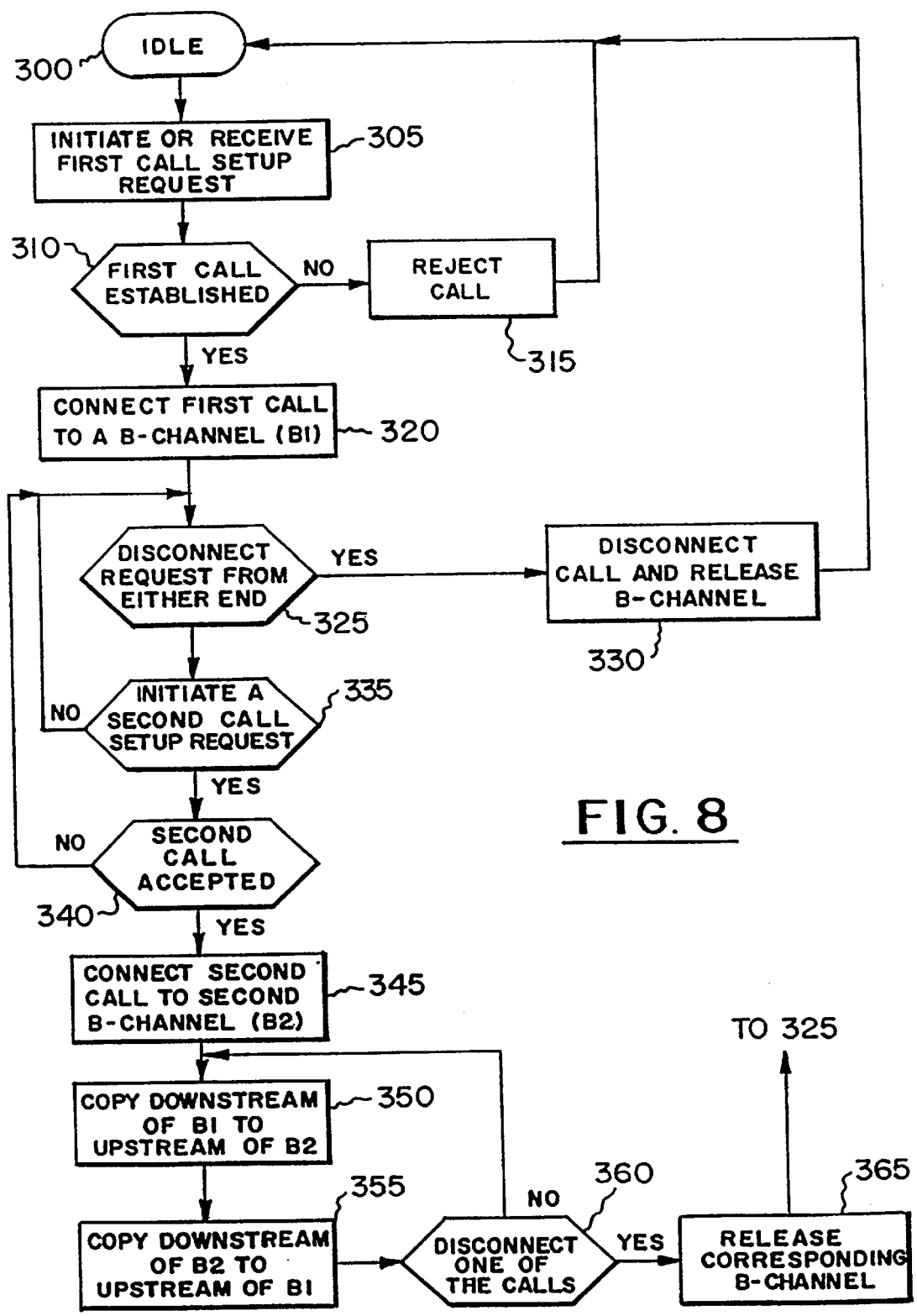
FIG. 8 is a flow chart of a call processing program used for call conferencing in the adapter based implementation of FIG. 2.

Referring now to FIG. 8, there is illustrated a flow chart including the basic process steps used by processor 30 in executing a call processing program which implements call conferencing in the network adapter based arrangement in accordance with the present invention. Again, the coding of the process steps of this flow chart into the instructions suitable to control the processor 30 will be understandable to one having ordinary skill in the art of programming.

After performing initial program load and power on diagnostic routines, the processor 30 enters the IDLE state indicated at block 300. As shown in block 305, program execution begins either in response to a call SETUP message initiated by communication device 6 at the subscriber's premise for an outgoing call or in response to receipt by communication device 6 of a call SETUP message for an incoming call from a Telco ISDN switch. Execution proceeds to block 310 where the processor 30 checks whether the first call has been established. Block 310 represents conventional handshaking as described above with regard to block 110 of FIG. 5. If the call is not established (e.g., busy line), the NO branch is taken from block 310 to block 315 where the call is rejected and a busy signal is returned to the communication device 6. Next, the processor 30 returns to the IDLE block 300.

Referring back to block 310, if a call is established the YES branch is taken from block 310 to block 320 where the first call is connected to a first B-channel. Execution proceeds to block 325 where a check is made to determine whether a DISCONNECT call request has been made from either party, and if it has, the YES branch is taken from decision block 325 to block 330 to end the call and release the B-channel. The system will then return to the idle state at block 300. If no disconnect request is made, execution proceeds from block 325 to block 335 where a check is made to determine whether a call SETUP request is initiated by the subscriber's communication device 6 to establish a second call. If so, the processor 30 then checks whether the second call is accepted by the person receiving the second call. After the second call is accepted, execution proceeds to block 345 where the second call is connected to the second B-channel.

In the next two blocks 350 and 355 the processor 30 will mix the voice signal of one of the B-channels with the voice signal of the other B-channel so that each of the three parties can listen to each other. More specifically, in block 350 the local voice signal of one B-channel (B1) is copied downstream of B1 to the upstream of the other B-channel (B2) while in block 355 the local voice data signal of B2 is copied downstream of B2 to the upstream of B1. This voice mixing can be summarized by the following equations:

$$US(B)=US(B1)+US(B2)$$

$$DS(B1)=US(B2)+DS(B)$$

$$DS(B2)=US(B1)+DS(B)$$

where US is upstream and DS is downstream. The voice mixing can be performed utilizing conventional digital signal processing algorithms programmed within processor 30.

This voice mixing of the two B-channels by the processor 30 will continue until one of the calls is disconnected from the conference call as shown by blocks 350, 355 and 360. When a request is made from any communication on the conference call to disconnect its respective call, the YES branch of block 360 is taken to block 365 where the corresponding B-channel is released by the processor 30. Execution then proceeds to block 325 where execution proceeds as described above. This method can be used to establish up to three calls on the conference call. By connecting each of the calls to a separate communication channel and voice mixing the two channels, the adapter 10 eliminates the need for the Telco's switching system to conference the calls.

Figure 9:
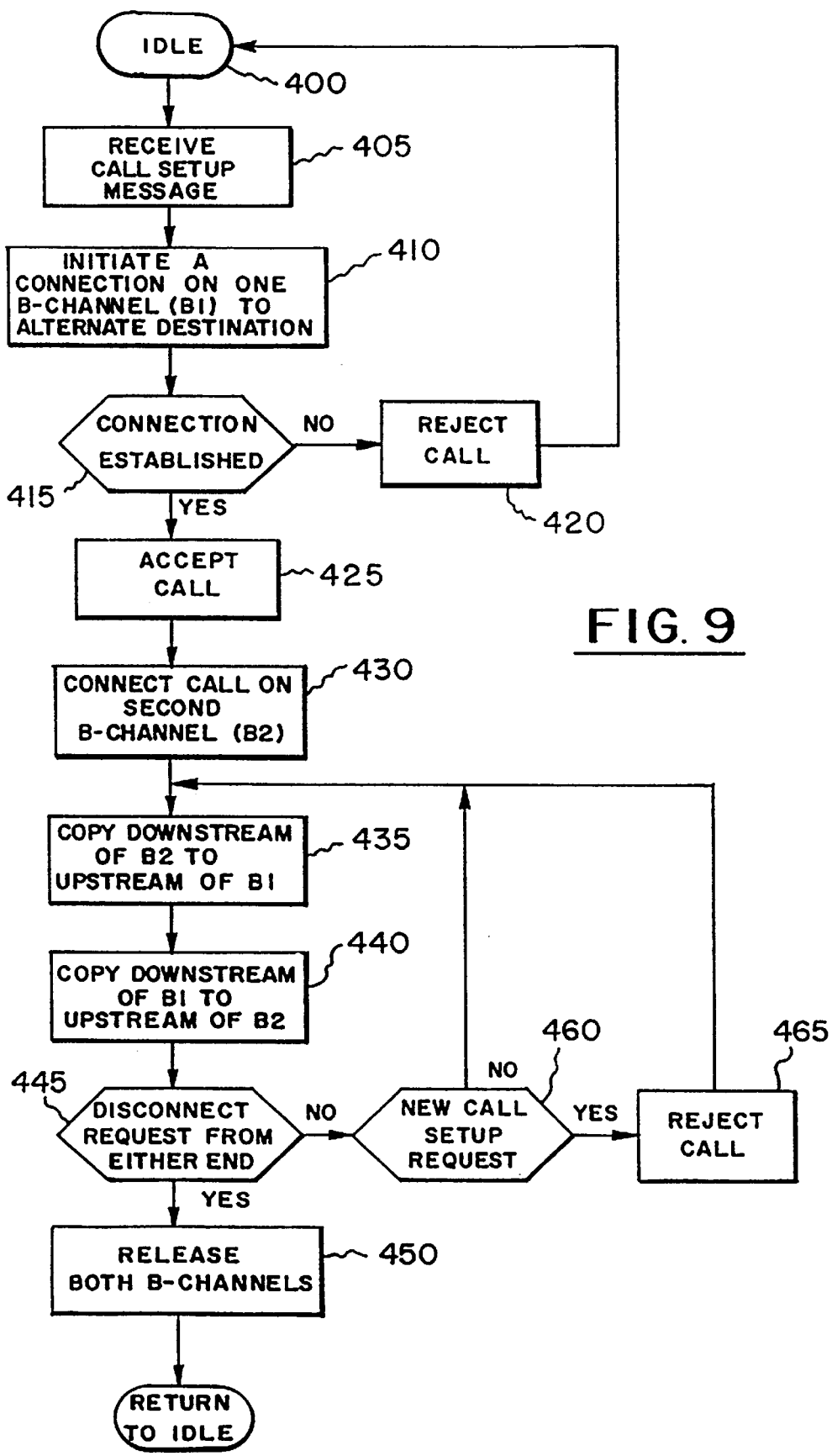
FIG. 9 is a flow chart of a call processing program used for call forwarding in the adapter based implementation of FIG. 2.

Referring now to FIG. 9, there is illustrated a flow chart including the basic process steps used by processor 30 in executing a call processing program which implements call forwarding in the network adapter based arrangement in accordance with the present invention. Again, the coding of the process steps of this flow chart into the instructions suitable to control the processor 30 will be understandable to one having ordinary skill in the art of programming.

After performing initial program load and power on diagnostic routines, the processor 30 enters the IDLE state indicated at block 400. Program execution begins in response to receipt by communication device 6 of a call SETUP message for an incoming call from the ISDN switch as shown 405. Execution proceeds to block 410 where the processor 30 will initiate call handling messages to establish a connection on one of the B-channels between the communication device 6 and a device at the number where the call is to be forwarded. This is done by providing and receiving appropriate call messages between the ISDN switch and the communication device 6 at the subscriber's premise such as SETUP, SETUP ACK, ALERTING, CONNECT, etc.

Execution proceeds from block 410 to decision block 415 where the processor 30 checks whether the connection has been established between the subscriber's terminal equipment 6 and the terminal equipment at the forwarded location. If the call is not established (e.g., the forwarded number is busy), the NO branch is taken from block 415 to block 420 where the call is rejected, a busy signal is returned to the device which initiated the call and execution returns to the idle state at block 400.

Referring back to block 415, if the connection is established on the first B-channel, the YES branch is taken from block 415 to block 425 where the incoming call made to the communication device 6 is accepted. Next, execution proceeds to block 430 where the incoming call is connected to the second B-channel. Thus, after the processor 30 has completed the processing steps in block 430, a first connection is established on the first B-channel between the device 6 and the device at the forwarded location while a second connection is established on the second B-channel between the device 6 and the incoming call.

Execution proceeds to blocks 435 and 440 where the processor 30 will mix the voice signal of the first B-channel (B1) with the voice signal of the second B-channel (B2) so that the party initiating the call can communicate with the party at the forwarded location. The voice mixing of the two B-channels in blocks 435 and 440 is identical to the voice mixing described above with regard to blocks 350 and 355 of FIG. 8. By establishing the first and second connections described above on the two B-channels of a Basic Rate Interface and voice mixing the two B-channels, the network adapter 10 eliminates the need for the Telco switch to forward the call.

Execution proceeds from block 440 to block 445 where the processor 30 checks whether a disconnect request is made from either party to the call. If a request is made to disconnect the forwarded call form either end, the YES branch of block 445 is taken to block 450 where both B-channels associated with the communication device 6 at the subscriber's premise are released by the processor 30 and execution returns the idle state as indicated at block 455. If a disconnect request is not made from either end, the processor 30 will check to see if a new call setup request has been made to the device 6 as shown at block 460. If a new call setup request has not been made, execution proceeds to blocks 435 and 440 where data mixing continues. If a new call setup request is made, then the YES branch is taken from block 460 to block 465 where the new call is rejected and a busy signal is returned to the new calling party. Execution then proceeds to blocks 435 and 440 as described above. Thus, the processor 30 will loop within blocks 435, 440, 445, 460 and 465 and continue to voice mix the two B-channels until a disconnect call request is received from the device which made the initial call or the device at the forwarded location.

Figure 10:
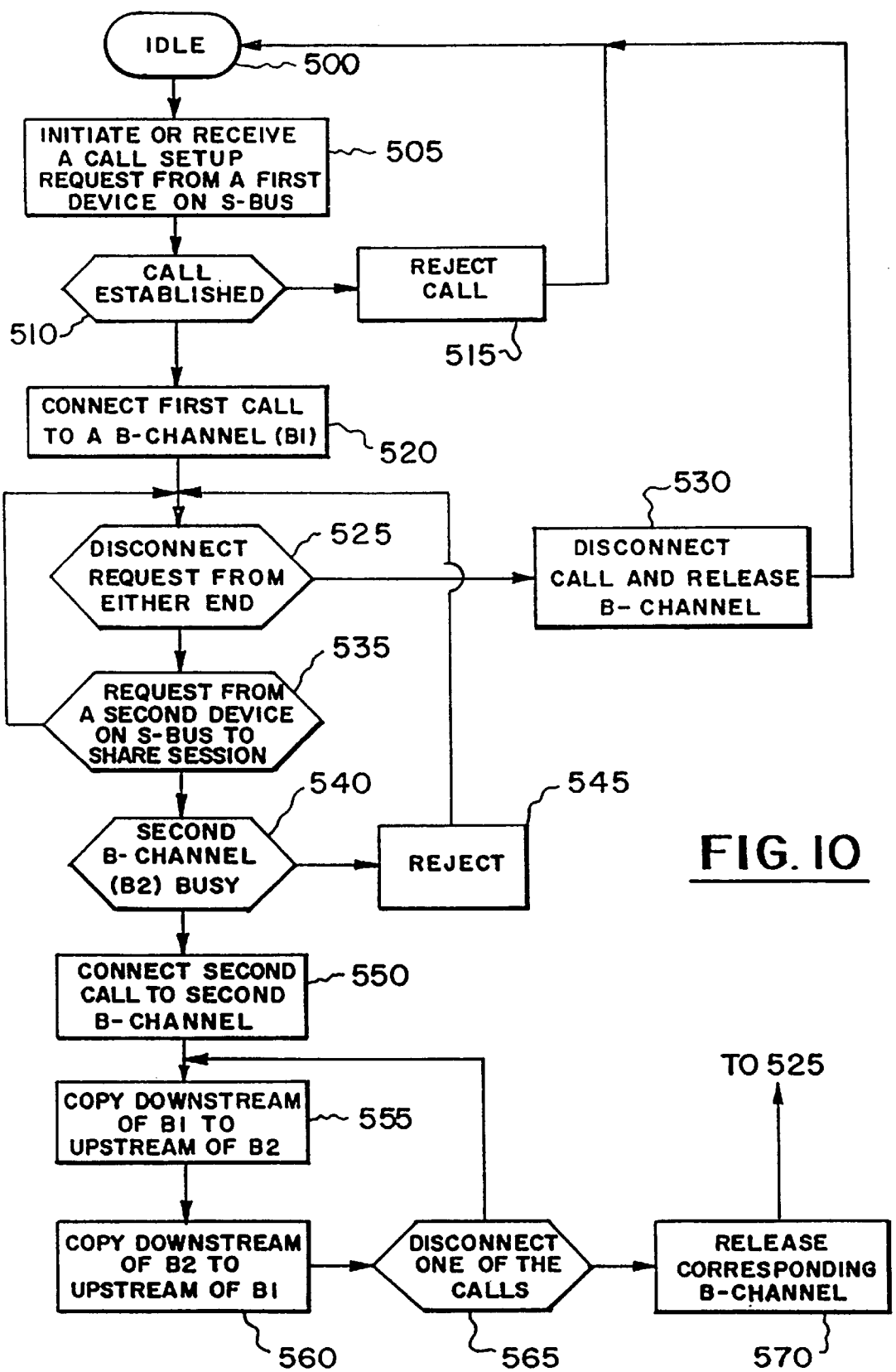
FIG. 10 is a flow chart of a call processing program used to establish intercommunication between two digital communication devices coupled to an S-bus in the adapter based implementation of FIG. 2.

Referring now to FIG. 10, there is illustrated a flow chart including the basic process steps used by processor 30 in executing a call processing program which allows two digital communication devices 8 on the same S-bus 22 to share a communication session. Again, the coding of the process steps of this flow chart into the instructions suitable to control the processor 30 will be understandable to one having ordinary skill in the art of programming.

After performing initial program load and power on diagnostic routines, the processor 30 enters the IDLE state indicated at block 500. As shown in block 505, program execution begins either in response to a call SETUP message initiated by digital communication device 12 at the subscriber's premise for an outgoing call or in response to receipt by digital communication device 12 of a call SETUP message for an incoming call from a Telco ISDN switch. Execution proceeds to block 510 where the processor 30 checks whether the first call has been established. Block 510 represents conventional handshaking as described above with regard to block 110 of FIG. 5. If the call is not established, the NO branch is taken from block 510 to block 515 where the call is rejected and a busy signal is returned to the communication device 12. Next, the processor 30 returns to the IDLE block 500.

Referring back to block 510, if a call is established the YES branch is taken from block 510 to block 520 where the first call is connected to a first B-channel. Execution proceeds to block 525 where a check is made to determine whether a DISCONNECT call request has been made, and if it has, the YES branch is taken from decision block 525 to block 530 to end the call and release the B-channel. The system will then return to the idle state at block 500. If no disconnect request is made, execution proceeds from block 525 to block 535 where a check is made to determine whether a request has been made from another digital device 12 on the same multi-drop S-bus 22 to share the communication session with the first digital device 12. The second digital device 12 could be for example, another phone, a fax, etc. If the second digital device 12 has not made a share request, the NO branch is taken from block 535 back to block 525. Thus, it can be seen that when one call is active the system will remain in a loop between blocks 525 and 535 while waiting for either a share request from a second digital device 12 or a request from either end of the first call to disconnect the first call.

Referring back to block 535, if a share request is made, the YES branch is taken to decision block 540. At decision block 540 the processor 30 checks whether the second B-channel is available. If the second B-channel is busy, then the YES branch is taken from decision block 540 to block 545 where the call is rejected, a busy signal is returned to the second digital device 12 and the system returns to decision block 525.

Referring back to block 540, if the second B-channel is available then the NO branch is taken from block 540 to block 550 where the second digital device 12 is connected to the second B-channel. In the next two blocks 555 and 560 the processor 350 will mix the voice signal of one of the B-channels with the voice signal of the other B-channel so that each of the three parties can listen to each other. The voice mixing of the two B-channels in blocks 435 and 440 is identical to the voice mixing described above with regard to blocks 350 and 355 of FIG. 8. This voice mixing of the two B-channels by the processor 30 will continue until one of the calls is disconnected from the call as shown by blocks 555, 560 and 565. When a request is made from any communication device on the call to disconnect its respective call, the YES branch is taken from decision block 565 to block 570 where the corresponding B-channel is released by the processor 30. Execution then proceeds to block 535 where execution proceeds as described above.

Any one or more of the call processing programs can be included in network adapter 10 depending on the class services that the subscriber desires to have. In addition, it should be understood that although each of the call processing programs except FIG. 9 were described with regard to analog devices 6, the methods of the present invention can also be performed with adapter 10 using digital devices 12. In addition, the adapter 10 can be used with analog devices of a subscriber that only has an analog class of service or digital devices of a subscriber that only has a digital class of service.

In another embodiment of the present invention, special flash hook and touch tone commands allow a user to perform call hold/retrieve, call waiting and three way call conferencing functions when the communication device 6 is an analog telephone coupled to the ISDN network via the adapter 10. In addition, if the user subscribes to multiple call appearances provided by the telco, then up to a six way conference call can be established on the analog phone. Each of these functions can be performed on one B-channel using the analog phone when a user has subscribed to EKTS service on the ISDN network. The analog signals (switch hook and touch tone commands described below) input by a user to the analog phone are converted to ISDN EKTS signals using the interface circuit 39, DTMF decoder 41 and the filter 43 shown in FIG. 4 as described above.

A typical telephone handset for an analog phone includes a switch hook and 12 buttons (digits 0–9, * and #). There are three types of hook flashes that can be used by the handset in accordance with the present invention. A short hook flash is a temporary depression of the switch hook that lasts less than one second. Some handsets have a "flash" key which can be used to generate a short hook flash. A long hook flash comprises a temporary depression of the switch hook for longer than two seconds. A long hook flash is treated as if the phone was placed on-hook for a prolonged period of time and then taken off-hook. A flash key should not be used to generate a long hook flash. The third type of switch hook activity is a double hook flash which comprises two short hook flashes, back to back within a two second period.

By utilizing these switch hook activities a user can place a call on hold while answering a waiting call, place a call on hold and dial another call and retrieve a call placed on hold. In addition, if multiple call appearances have been subscribed to, the user can place two calls on hold and dial a third call and retrieve a call placed on hold in order of the oldest call on hold to the newest.

Referring to FIG. 11, there is shown a state table listing the various states that a user can be in along with the state resulting from one of the three flash hook commands. If there are no calls waiting, no calls on hold, no conference call and the user hears a dial tone, busy tone or error tone the result of any of the three flash hook activities will be a dial tone.

A short hook flash is used to hold active calls and/or connect to non-active calls. If a user is engaged in an active call, a short hook flash will always place that active call on hold. If there is no call waiting, no calls on hold and no conference and additional call appearances are available, the user will be provided a dial tone. If no additional call appearances are available, the user will hear an error tone. If there is a call waiting and no conference, the user will be connected with the waiting call. If there is no conference, but there is a prior call on hold, the user will be connected with the oldest call on hold. When the current state is a dial tone and their is one call on hold, a short hook flash will connect the user to the call on hold. If there are two calls on hold and a dial tone, the user will be connected to the oldest call on hold.

The result of a double hook flash will always be a dial tone if sufficient call appearances are available. If sufficient call appearances are not available, the result of a double hook flash will always be an error tone. The active call at the time of a double hook flash will be placed on hold if no conference call has been established. Any waiting calls at the time of the double hook flash will also be placed on hold. Calls that were already on hold at the time of the double hook flash will remain on hold. When the current state is a dial tone and their is one or two calls on hold, a double hook flash will keep the user in the current state.

If there is currently an active call and no conference, the result of a long hook flash will always be to disconnect (hang up) the active call. If there were no calls waiting or on hold at the time of the long hook flash, a dial tone will be presented. If there was a call waiting at the time of the long hook flash, the user will be connected to the waiting call. If there was no call waiting, but there were calls on hold, the user will be connected with the oldest call on hold. When the current state is a dial tone and their is one call on hold, a long hook flash will connect the user to the call on hold. If their are two calls on hold and a dial tone the user will be connected to the oldest call on hold.

While there are waiting calls, or calls on hold, the user may go permanently on hook. If the user does so, the user's phone will ring back and when he answers the phone, he will be connected with the same party as if he had done a long hook flash. The various states for the switch hook activities described above are summarized in rows 1–6 of the state table shown in FIG. 11.

In another embodiment of the present invention, the three switch hook activities along with a touch tone command can be used to produce up to a six way conference call on the analog phone coupled to the ISDN network via network adapter 10. The conference call can be handled on one B-channel according to EKTS standards. First it should be noted that in order to produce a conference call, the user must subscribe to either the ISDN 3 WAY CONFERENCE facility or the ISDN 6 WAY CONFERENCE facility provided by the telco. If a user attempts to set up a conference call and he has not subscribed to either of these facilities, he will receive an error signal. The two calls that he was attempting to conference will both be left on hold. If a user attempts to add a call to an existing conference and insufficient conference slots are available he will receive an error signal and the last call will be terminated. The conference will continue to be on hold. It should further be noted that while a conference is established, all incoming calls are returned as busy. Management of incoming calls is not required while a conference is active.

In order to establish a conference call, a user places a call to a first party and establishes an active call. Next, the user performs a short hook flash (or a double hook flash) which will place the active call on hold and gives a dial tone (see row 2 of FIG. 11). The user then places a second call and waits for an answer. Once connected to the second call a double hook flash will place the second call on hold and give the user a dial tone. (row 4). A three way conference call can now be established between the three parties by entering the command * * 1. There are other methods of getting to the point where a user will have two calls on hold and a dial tone (see for example, row 3). A three way conference call can be established at any time there are two calls on hold and a dial tone by the command * * 1. It should be understood that * * 1 is exemplary only and any three characters can be programmed by one skilled in the art to perform the functions of this command.

A user can place the conference on hold and make an additional call. This is done by performing a short hook flash (or a double hook flash) while in conference. This will put the conference on hold and produce a dial tone. The non conference call can then be placed. The non conference call can be terminated by performing a long hook flash. This will cause the user to rejoin the conference and to terminate the non conference call. If the user received a busy signal from the non conference call the user can return to the conference by performing a short or a long hook flash.

Up to three additional parties can be added to the conference call as long as the user has subscribed to the ISDN 6 way conference facility. To add a party to a conference call, the conference is placed on hold and a dial tone is generated by performing a short hook flash while in conference. Next, the new party is dialed and after the new party's phone began ringing or the new party has answered, the new party may be added to the conference by doing a second short hook flash (or double hook flash). (Note that if the new party joined the conference while his phone was ringing all parties to the conference will hear the ringing and as soon as the new party answers the phone he will join the conference.) This will add the new party to the conference as well as return the user to the conference. These steps can be repeated to add up to three additional parties for a six way conference call. If the user did not wish to add the new party to the conference, then instead of performing the second short hook flash the user can perform a long hook flash which will terminate the call made to the new party and return the user to the conference as indicated above.

The last party that was added to a conference call can be dropped by a entering a drop command. A situation where a user may want to drop the last party may arise where the call was added to the conference while it was ringing and the called party never answered or the answering party was not the person targeted by the call or was unavailable. The last call added a three way conference call established.

After the conference call is established, the conference continues to exist as long as there are at least two potential participants. That is, if distant parties who were in a conference have hung up to the point that only the user and one distant party are left, this is still a conference call. A conference call can be ended in one of two ways. A conference call may be terminated if all distant parties hang up their respective phones. It can also be ended if the user performs either a long hook flash while a part of the conference or permanently goes on hook while the user is part of the conference. A long hook flash performed while the conference exists but while the user hears a dial tone would only cause the user to rejoin the conference.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A method of processing a call with a network adapter located at a digital network subscriber's premises, the network adapter operatively coupling a first communication device to a digital network and a telco switchover one of first and second communication channels, said method comprising the steps of:

establishing a first call on the first communication device over the first communication channel, determining whether a second call is being made to the first communication device;

connecting to the first communication device, the second call on the second communication channel without the first call being placed on hold by the telco switch; and in response to a toggle signal from the first communication device toggling between said first and second calls with said first communication device without either the first or second call being placed on hold by the telco switch.

2. The method according to claim 1, further including the step of:

releasing one of said first and second communication channels in response to a disconnect request made by any one communication device connected to said first or second call.

3. The method according to claim 1, wherein said step of connecting said second call further comprises the steps of:

determining whether said second communication channel is available only in response to a determination that said second call request is being made, and establishing a connection on said second communication channel only in response to a determination that the second communication channel is available.

4. The method according to claim 1, further including the steps of:

receiving a setup message for a third call at said network adapter, and rejecting said third call.

5. The method according to claim 1, wherein the digital network comprises an Integrated Services Digital Network and the first and second communication channels comprise ISDN B-channels of a basic rate interface.

6. The method according to claim 1, wherein said communication device comprises a device selected from the group consisting of digital devices and analog devices.

7. The method according to claim 6, wherein said subscriber's premise includes analog and digital devices both of which are connected to the digital network via first and second pairs of conventional telephone wires, said first pair of wires operatively connected to said adapter and said digital network and said second pair of wires operatively connected to analog devices and said network adapter.

8. A method of processing a call with a network adapter apparatus located at a digital network subscriber's premises, the network adapter operatively coupling first and second communication devices at the subscriber's premises to a telco switch over first and second communication channels, the method comprising the steps of:

A) receiving an incoming first call to the first communication device;

B) establishing the first call on the first communication device over the first communication channel;

C) receiving an incoming second call to the first communication device; and

D) connecting the second call to the second communication channel; and in response to a toggle signal from the first communication device E) placing the first call on the first communication channel on hold without the intervention of the telco switch.

9. The method of claim 8 further comprising the steps of:

F) in response to a toggle signal from the first communication device, reestablishing the first call by recoupling the communication device to the first communication channel without such recoupling being performed by the telco switch.

10. The method of claim 9 wherein step F further comprises:

F.1) placing the second call on hold without the intervention of the telco switch.

11. The method of claim 8 wherein step D further comprises the steps of:

D.1) determining whether the second communication channel is in use.

12. The method of claim 8 wherein the digital network comprises an Integrated Services Digital Network and the first and second communication channels comprise ISDN B-channels of a basic rate interface.

13. A method of processing calls with a network adapter apparatus located at a digital network subscriber's premises, the network adapter operatively coupling first and second communication devices located a the subscriber's premises to a telco switch over a digital network, the digital network comprising first and second communication channels, the method comprising the steps of:

A) establishing a first call on the first communication device over the first communication channel; and B) connecting a second call to the second communication channel without the first call being placed on hold by the telco switch; and in response to a toggle signal from the first communication device C) toggling between the first and second calls on the first communication device without either of the first or second calls being placed on hold by the telco switch.

14. The method of claim 13 wherein the second communication device is coupled to the second communication channel and step B further comprises:

B.1) connecting the second call to the second communication device.

15. The method according to claim 14 wherein step B further comprises:

B.2) determining whether the second call request is being made to the subscriber's premises;

B.3) determining whether the second communication channel is available only in response to a determination that the second call request is being made; and B.4) connecting the second call on the second communication channel to the first communication device only in response to determination that the second communication channel is available.

16. The method of claim 13 wherein the digital network comprises and Integrated Services Digital Network and the first and second communication channels comprise ISDN B-channels of a basic rate interface.

* * * * *